Feb. 12, 1952 — J. R. COFFING — 2,585,371
LIVESTOCK FEEDER
Filed June 9, 1950 — 2 SHEETS—SHEET 1
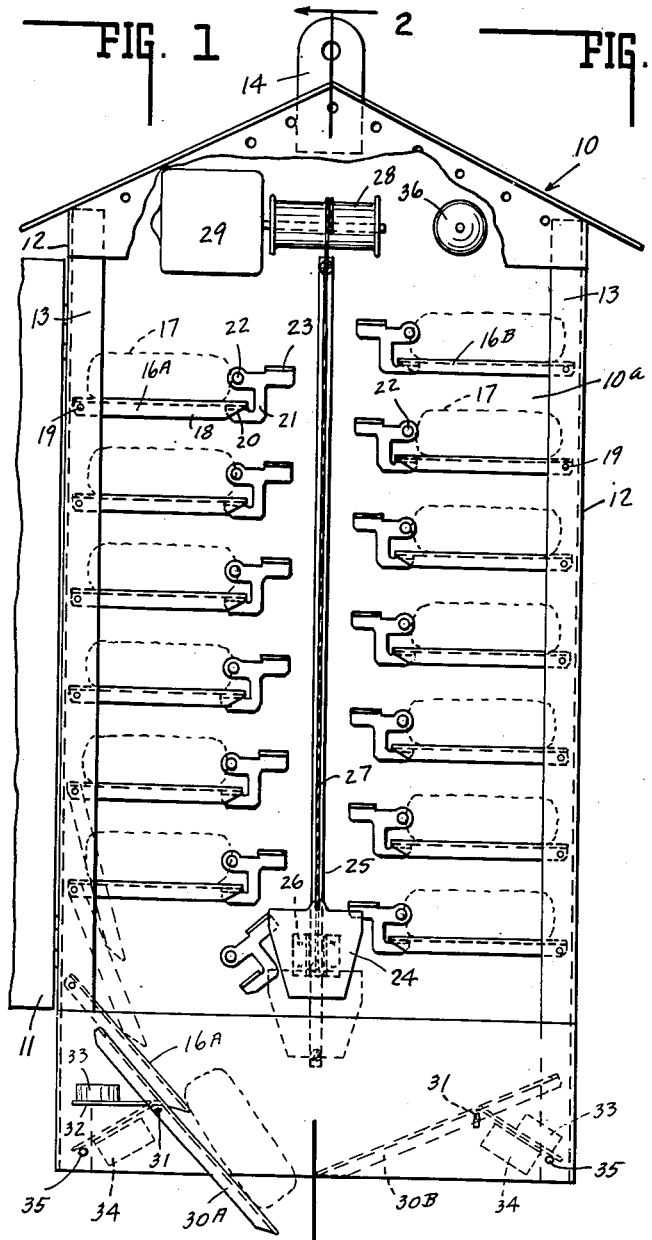
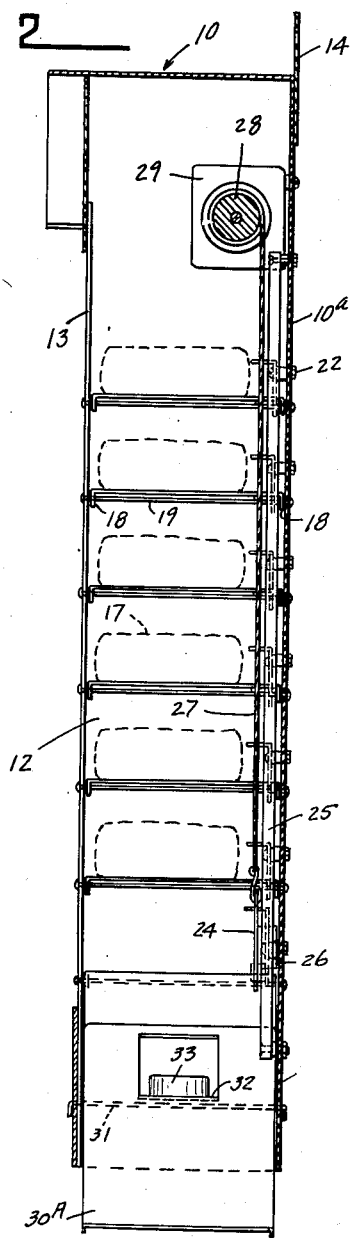
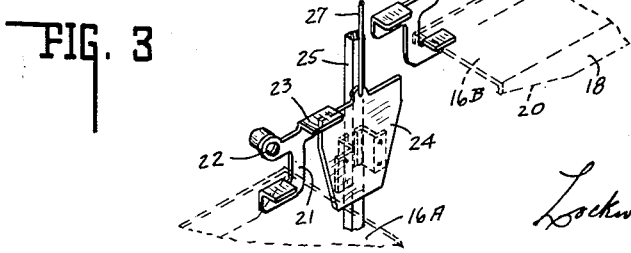
INVENTOR.
JAMES R. COFFING.

Feb. 12, 1952 J. R. COFFING 2,585,371
LIVESTOCK FEEDER
Filed June 9, 1950 2 SHEETS—SHEET 2
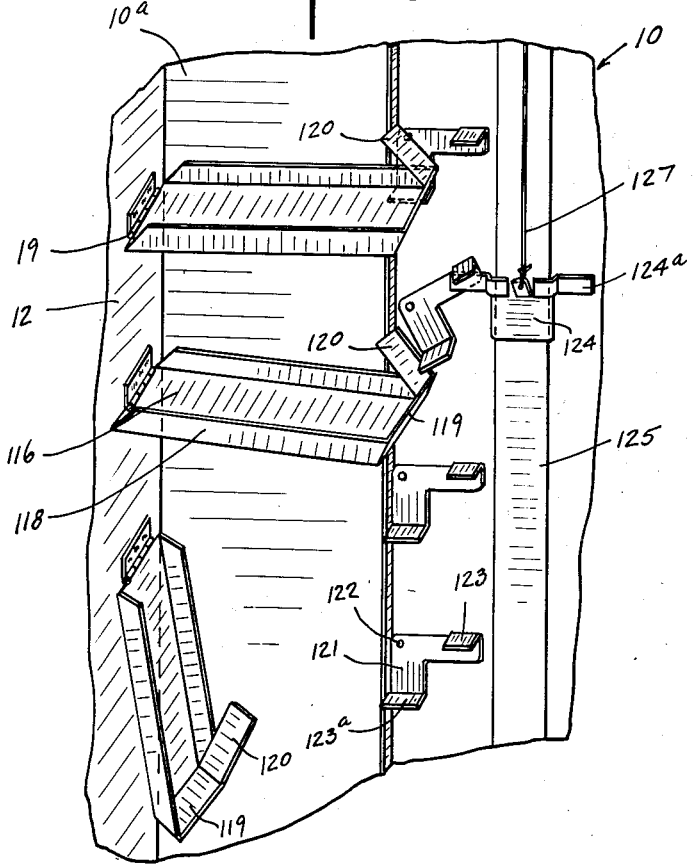
INVENTOR.
JAMES R. COFFING.
BY
Lockwood, Hahn, Galt & Woodard,
ATTORNEYS.

Patented Feb. 12, 1952

2,585,371

UNITED STATES PATENT OFFICE 2,585,371

LIVESTOCK FEEDER

James R. Coffing, Danville, Ill.

Application June 9, 1950, Serial No. 167,234

5 Claims. (Cl. 161—10)

This invention relates to a live stock feeder, and more particularly to a type suitable for automatic periodic feeding of small animals or pets such as dogs. As herein shown by way of example, the feeder is designed for delivery of rationed dog food every twelve hours, 24 hours, or any other desired time designation over a seven day period, or at shorter or longer intervals over a shorter period or longer period as desired.

The invention in general consists of an upstanding cabinet carrying a series of superimposed food supporting shelves with time actuated mechanism operable to release said shelves in sequence from the lower to the upper shelf at predetermined intervals. Upon said shelves being progressively released, the food ration carried thereby slides from the shelf to drop onto a fulcrumed counter-weight release door at the bottom of the housing and thence into a feed pan. As the fulcrumed door is actuated to receive and deliver the food into the pan a signal device, such as a bell, is caused to be operated which, upon suitable training, serves to call the pet or other animal to the feed pan.

By means of this arrangement the shelves may be loaded with a suitable ration of food for each feeding, said food being of a character as not to require refrigeration. Thereupon the animal is fed regularly at predetermined intervals without attendance over a period of several days, after which the feeder may be reloaded and the cycle repeated.

The full nature of the invention will be understood from the accompanying drawings and the following description and claims:

Fig. 1 is a front elevation of the feeder with the closing door opened for viewing the interior thereof, one of the lower shelves having been released and the position of superimposed shelves being shown by dotted lines in released position.

Fig. 2 is a side view taken on the line 2—2 of Fig. 1.

Fig. 3 is a perspective view illustrative of the time-actuated shelf tripping mechanism.

Fig. 4 is a perspective view showing a modified form of shelf, with parts broken away.

In the drawings there is shown for purpose of illustrating one modification of the invention, a dog feeder comprising an upstanding cabinet 10 having a hinged door 11 for closing the interior thereof, said door being shown in its open position with a portion thereof broken away. The cabinet includes a rear wall 10a and side walls 12, the side walls being flanged inwardly along the open front of the cabinet, as indicated at 13. The cabinet may be hung on the wall of a building by a supporting bracket 14 in spaced relation to the floor upon which a feed pan 15 may rest immediately therebelow, as shown in Fig. 2.

Along each side wall of the cabinet there is pivotally mounted a series of superimposed food supporting shelves 16A and 16B. The A series of shelves extend outwardly from their pivotal mounting toward the center of the cabinet in equally spaced relation, and the B series of shelves likewise extend toward the center of the cabinet from their pivotal mountings, the shelves of the respective series being spaced in staggered relation. The spacing distance between the shelves of both series must be one-half of the spacing distance between shelves of the respective series.

Each shelf is adapted to support a package or ration of food, as indicated at 17. Said shelves are preferably formed of sheet metal with flanged reinforcing edges 18 for receiving the pivotal mounting rods 19 extending through the rear wall 10a and flange 13 of the cabinet, the forward free edges of the flanges 18 being beveled, as indicated at 20.

Each said shelf is normally supported in its horizontal position by a latch 21 fulcrumed to the rear wall of the cabinet at 22 and having a downwardly-extending engaging hook normally in latching engagement with the free end thereof. Said latch carries a trip head 23 which, upon engagement in an upward direction, swings the latch about its fulcrum to release a shelf and permit it to drop about its pivotal mounting to the position shown by dotted lines at the left of Fig. 1.

Wherein it is desired to effect a feeding every twelve hours, the lower shelf 16A is first tripped and released and twelve hours later the lower shelf of the series B is tripped and released. Each alternate shelf is thus tripped and released progressively at twelve hour intervals. For this purpose there is provided a trip member 24 slidably movable and guided on a vertical track 25 secured to the rear wall 10a of the cabinet and equally spaced from the opposed series of shelves. The trip member is mounted upon a guide bracket 26 which partially embraces the track 25. Said trip member is raised and lowered on the track by a cable 27. Said cable extends upwardly along the track 25 to pass over a winding spool 28 rotatably mounted in the upper end of the cabinet to be driven by an electric clock motor 29. The clock motor is provided with a two-way friction clutch of any suitable type so that when the trip member 24 reaches the spool it will merely stop by means of coming in contact with one of the bolts that secure the track 25 to the rear wall 10a. When the feeder is ready to reload with food, by means of the same two-way friction motor clutch, the trip member 24 may be manually lowered to the bottom of the track in preparation for a new cycle.

The clock motor is so timed in any suitable manner to move through the distance between adjacent shelves 16A and 16B over a time period of twelve hours. However, it is to be understood that the speed of movement of the trip member and the distance between adjacent shelves may be varied to effect a feeding at any desired time interval, there being as many feedings as there are shelves carried in the cabinet. In this connection it may further be observed that whereas the modification herein shown provides for a double series of shelves in staggered relation, the operation of the feeder is the same wherein there may be provided only a single series of shelves.

As the respective shelves are tripped and released by the upward movement of the trip member 24 the package 17 of food slides from the shelf, dropping onto a counterweighted fulcrumed trap door 30A, there being a similarly opposed trap door 30B, each of said doors extending under their respective series of shelves. Each of said doors is fulcrumed to the rear wall 10a of the cabinet at 31, and has formed therein a rearwardly-extending shelf 32 carrying a counterweight 33, such that the trap door, upon receiving a discharged ration of food, will tilt downwardly for directing it into the feed pan 15, and as soon as it is relieved of the weight of the food the counterweight will return it to an angularly closing position of the door 30B. When both doors are in their upper position, the bottom of the cabinet is closed, it being swung to its open position only momentarily to deliver a food ration.

One of said trap doors is positioned to engage a microswitch 34 supported on the cabinet and normally in circuit breaking position when the door is raised. When the door is swung downwardly to discharge a ration of food, it engages the microswitch to close the circuit therethrough. The microswitch circuit (not shown) is connected with any suitable electric signalling or call device, such as a bell, whereby upon the ration of food being delivered to the feed pan 15, through the medium of the microswitch, the animal will be given a call signal to which it may be trained to respond.

In operation, assuming that a feeding cycle has been completed with the trip member 24 at the uppermost position and all the shelves in their released position, the trip member is manually pulled down to its lowermost position, unwinding the spool 28. It will slide by the disengaged latches 21 by reason of the beveled side edges of the trip member engaging and camming the trip heads 23 as it is drawn downwardly. After the trip member is manually drawn to its lowermost position, the shelves are reset in their horizontal latched position and each shelf supplied with a ration of food 17. The trap doors are normally in their closed position, whereupon the swinging door 11 may be closed and the feeder in condition to begin a new feeding cycle. Depending upon lapse of time until the next following feeding time the trip member has been manually set in its lowermost position in such spaced relation to the lowest shelf that said shelf will be tripped for the next feeding which may be only a few hours away. Thus the trip member may be manually set only a short distance below the first trip head. Thereafter, during each interval between feedings the trip member will have been raised by the clock motor and spool the distance between adjacent opposed trip heads so that they will be actuated in the prescribed relation. As each one is operated it drops down to discharge the food ration and remains in its downward position out of the way of the next superimposed shelf. As the food ration drops onto either of the trap doors 30A or 30B, they are actuated to open and deposit the food ration in the feed pan 15, at the same time electrically actuating the call signal or bell through their respective microswitches 34.

In the modified form of the feeder as shown in Fig. 4 the operation is substantially the same as above described, but wherein the shelves 116 are in the form of pans with upwardly extending side walls 118 and a sloping end wall 119. By the use of such pan-like shelf food may be retained therein in the form of a stack of pellets or the like. When the shelf drops down to the release position as shown the pellets or the like will be discharged over the sloping end wall 119 on to the trap door and into the feed pan.

To facilitate resetting of the shelves there is provided a camming finger 120 secured to one forward corner of the shelf positioned to engage an outstanding flange 123a on the fulcrumed latch 121. Said latch is fulcrumed at 122 on the rear wall 10a of the cabinet and is provided with a trip head 123. As each pan is returned from its released position to its latched position the finger 120 engages the flange 123a swinging the latch into position to permit the bottom of the shelf to ride thereover and be engaged thereunder as the latch returns to its normal position.

Slidable on the vertical track 125 there is a trip member 124 supported by the cable 127 in the manner above described, said trip member having laterally extending arms 124a positioned to progressively engage the respective trip heads 123 to release the pan-like shelves as the trip member is raised.

The invention claimed is:

1. A live stock feeder comprising an upstanding cabinet having a series of spaced pan-like shelves each with an upstanding side wall and an outwardly sloping end wall, means for hingedly mounting said shelves to said cabinet at the end opposite said end wall, a latch mounted on said cabinet for supporting engagement with the free end of each of said shelves, a latch tripping member movable vertically relative to said latches for progressive engagement therewith to effect the release of their respective shelves for permitting discharge of food retained therein over the said end wall, means for moving said tripping member to progressively engage said latches at predetermined intervals, and a camming element extending upwardly and rearwardly from the end wall of each of said shelves engageable with the respective latches to permit positioning of a released shelf in latched position.

2. A live stock feeder comprising an upstanding cabinet having a series of vertically spaced food supporting shelves, means for hingedly mounting each of said shelves within said cabinet at one end thereof to permit the free end to swing downwardly from its food supporting position, a latch mounted on said cabinet for supporting engagement with the free end of each of said shelves, a latch tripping member movable vertically relative to said latches for progressive engagement therewith to effect release of their respective shelves for permitting discharge of food retained thereon, means for moving said tripping member to progressively engage said latches at predetermined intervals, and a camming element extending upwardly and rearwardly from the free end of each of said shelves positioned for camming engagement with the respective latches to permit re-positioning of a released shelf into latching position after release thereof.

3. A live stock feeder comprising an upstanding cabinet having a series of spaced superimposed food supporting shelves pivotally mounted at one end thereof within said cabinet, a latch mounted on said cabinet for supporting engagement with the free end of each of said shelves, a guide track mounted in said cabinet extending from the lowermost to the uppermost shelf, a single latch tripping member slidably guided upon said guide member from a lowermost to an uppermost position for progressive engagement with said latches to effect food discharging release of their respective shelves, and a motor drive for said latch tripping member operable to slide it along said guide member at a predetermined speed to engage and trip said latches successively to release their respective shelves at predetermined time intervals.

4. A live stock feeder comprising an upstanding cabinet having a series of spaced superimposed food supporting shelves pivotally mounted at one end thereof within said cabinet, a latch mounted on said cabinet for supporting engagement with the free end of each of said shelves, a guide track mounted in said cabinet extending from the lowermost to the uppermost shelf, a single latch tripping member slidably guided upon said guide member from a lowermost to an uppermost position for progressive engagement with said latches to effect food discharging release of their respective shelves, a motor drive for said latch tripping member operable to slide it along said guide member at a predetermined speed to engage and trip said latches successively to release their respective shelves at predetermined time intervals, and a normally closed trap door under said series of shelves normally biased to closed position for receiving the food discharged and be thereby moved to open position for directing the received food to a feeding receptacle.

5. A live stck feeder comprising an upstanding cabinet having a series of spaced superimposed food supporting shelves pivotally mounted at one end thereof within said cabinet, a latch mounted on said cabinet for supporting engagement with the free end of each of said shelves, a guide track mounted in said cabinet extending from the lowermost to the uppermost shelf, a single latch tripping member slidably guided upon said guide member from a lowermost to an uppermost position for progressive engagement with said latches to effect food discharging release of their respective shelves, a motor drive for said latch tripping member operable to slide it along said guide member at a predetermined speed to engage and trip said latches successively to release their respective shelves at predetermined time intervals, a normally closed trap door under said series of shelves normally biased to closed position for receiving the food discharged and be thereby moved to open position for directing the received food to a feeding receptacle, an electrically actuated call signal mounted on said cabinet, and a control switch for said signal operable by the movement of said trap door to actuate said signal upon movement thereof to food directing position.

JAMES R. COFFING.

REFERENCES CITED

The following references are of record in the file of this patent:

UNITED STATES PATENTS

| Number | Name | Date |
| --- | --- | --- |
| 1,442,382 | Bullock | Jan. 16, 1923 |
| 1,966,017 | McEvoy | July 10, 1934 |